(12) United States Patent
Moroney et al.

US008904172B2

(10) Patent No.: US 8,904,172 B2
(45) Date of Patent: Dec. 2, 2014

(54) COMMUNICATING A DEVICE DESCRIPTOR BETWEEN TWO DEVICES WHEN REGISTERING ONTO A NETWORK

(75) Inventors: Paul Moroney, La Jolla, CA (US); Jiang Zhang, La Jolla, CA (US)

(73) Assignee: Motorola Mobility LLC, Libertyville, IL (US)

( * ) Notice: Subject to any disclaimer, the term of this patent is extended or adjusted under 35 U.S.C. 154(b) by 573 days.

(21) Appl. No.: 12/816,817

(22) Filed: Jun. 16, 2010

(65) Prior Publication Data

US 2010/0325654 A1     Dec. 23, 2010

Related U.S. Application Data

(60) Provisional application No. 61/223,271, filed on Jul. 6, 2009, provisional application No. 61/187,916, filed on Jun. 17, 2009.

(51) Int. Cl.
*H04W 12/02*     (2009.01)

(52) U.S. Cl.
USPC ............ 713/168; 725/30; 725/81; 713/170; 713/175; 726/5

(58) Field of Classification Search
USPC ............. 713/168, 170, 179, 181, 182, 184; 726/2–7, 18, 19, 22, 26–29
See application file for complete search history.

(56) References Cited

U.S. PATENT DOCUMENTS

| | | |
|---|---|---|
| 5,909,183 A | 6/1999 | Borgstahl et al. |
| 6,084,512 A | 7/2000 | Elberty et al. |
| 6,199,136 B1 | 3/2001 | Shteyn |
| 6,591,364 B1 | 7/2003 | Patel |
| 6,826,607 B1 | 11/2004 | Gelvin et al. |
| 6,983,370 B2 | 1/2006 | Eaton et al. |

(Continued)

FOREIGN PATENT DOCUMENTS

| | | |
|---|---|---|
| CN | 1221915 A | 7/1999 |
| CN | 101179380 A | 5/2008 |

(Continued)

OTHER PUBLICATIONS

PCT Search Report & Written Opinion, RE: Application #PCT/US2010/038963; Sep. 22, 2010.

(Continued)

*Primary Examiner* — Jung Kim
*Assistant Examiner* — Janusz Kusyk
(74) *Attorney, Agent, or Firm* — Fish & Richardson P.C.

(57) ABSTRACT

A method for registering a first device with a second device over a wireless network includes receiving a registration request from the first device and sending one or more user input choices to the first device. The user input choices each specify a user input action available though a user interface associated with the second device. A device description describing the second device is sent to the first device in a manner that allows it to be presented to the user by the first device. At least one of the user input actions are sequentially received through the user interface in response to instructions provided to the user by the first device. The first device is registered with the second device if the user input actions received by the second device correctly reflect the instructions provided to the user by the first device.

16 Claims, 3 Drawing Sheets

(56) References Cited

U.S. PATENT DOCUMENTS

| | | |
|---|---|---|
| 6,995,655 B2 | 2/2006 | Ertin et al. |
| 7,020,121 B2 | 3/2006 | Hardacker et al. |
| 7,092,670 B2 | 8/2006 | Tanaka et al. |
| 7,430,758 B2 * | 9/2008 | Toutonghi .................. 726/5 |
| 7,511,762 B2 | 3/2009 | Elnathan et al. |
| 7,613,426 B2 | 11/2009 | Kuehnel et al. |
| 7,741,852 B2 | 6/2010 | Watanabe et al. |
| 7,912,076 B2 | 3/2011 | Kim et al. |
| 8,001,381 B2 | 8/2011 | Metke et al. |
| 8,001,584 B2 | 8/2011 | Lortz et al. |
| 8,014,355 B2 | 9/2011 | Koga |
| 8,185,049 B2 | 5/2012 | Zhang et al. |
| 8,189,627 B2 | 5/2012 | Xia et al. |
| 8,239,551 B2 | 8/2012 | Oda et al. |
| 8,276,209 B2 | 9/2012 | Knibbeler et al. |
| 2002/0037708 A1 | 3/2002 | McCann et al. |
| 2002/0061748 A1 | 5/2002 | Nakakita et al. |
| 2002/0077077 A1 | 6/2002 | Rezvani et al. |
| 2002/0157002 A1 | 10/2002 | Messerges et al. |
| 2003/0045280 A1 | 3/2003 | Simons |
| 2003/0095521 A1 | 5/2003 | Haller et al. |
| 2005/0014503 A1 | 1/2005 | Nakakita et al. |
| 2005/0210261 A1 | 9/2005 | Kamperman et al. |
| 2006/0105712 A1 | 5/2006 | Glass et al. |
| 2006/0116107 A1 | 6/2006 | Hulvey |
| 2006/0156340 A1 | 7/2006 | Choi |
| 2006/0177066 A1 | 8/2006 | Han et al. |
| 2006/0224893 A1 | 10/2006 | Sales et al. |
| 2006/0288209 A1 | 12/2006 | Vogler |
| 2007/0079362 A1 | 4/2007 | Lortz et al. |
| 2007/0106894 A1 * | 5/2007 | Zhang et al. .................. 713/170 |
| 2007/0107020 A1 * | 5/2007 | Tavares .......... 725/81 |
| 2007/0118879 A1 * | 5/2007 | Yeun ................. 726/3 |
| 2007/0141986 A1 | 6/2007 | Kuehnel et al. |
| 2007/0150720 A1 | 6/2007 | Oh et al. |
| 2007/0152826 A1 | 7/2007 | August et al. |
| 2007/0178884 A1 | 8/2007 | Donovan et al. |
| 2007/0277224 A1 * | 11/2007 | Osborn et al. ................ 726/2 |
| 2008/0066120 A1 | 3/2008 | Igoe |
| 2008/0079601 A1 | 4/2008 | Ishihara et al. |
| 2008/0123739 A1 | 5/2008 | Reznic et al. |
| 2008/0134309 A1 | 6/2008 | Qin et al. |
| 2008/0250147 A1 | 10/2008 | Knibbeler et al. |
| 2008/0301436 A1 | 12/2008 | Yao et al. |
| 2008/0313462 A1 | 12/2008 | Zhao et al. |
| 2009/0061835 A1 | 3/2009 | Schmidt et al. |
| 2009/0103471 A1 | 4/2009 | Candelore |
| 2009/0122201 A1 | 5/2009 | Freundlich et al. |
| 2009/0132941 A1 | 5/2009 | Pilskalns et al. |
| 2009/0157521 A1 | 6/2009 | Moren et al. |
| 2009/0177511 A1 | 7/2009 | Shaw et al. |
| 2009/0217043 A1 | 8/2009 | Metke et al. |
| 2009/0235304 A1 | 9/2009 | Hardacker et al. |
| 2009/0240941 A1 | 9/2009 | Lee et al. |
| 2009/0241040 A1 | 9/2009 | Mattila et al. |
| 2009/0247197 A1 | 10/2009 | Graff et al. |
| 2009/0307492 A1 | 12/2009 | Cao et al. |
| 2009/0322948 A1 | 12/2009 | Funabiki et al. |
| 2010/0030904 A1 | 2/2010 | Oda et al. |
| 2010/0071010 A1 | 3/2010 | Elnathan et al. |
| 2010/0135259 A1 * | 6/2010 | Lee et al. .................. 370/336 |
| 2010/0164693 A1 | 7/2010 | Zhang et al. |
| 2010/0169399 A1 | 7/2010 | Moroney et al. |
| 2010/0169646 A1 | 7/2010 | Zhang et al. |
| 2011/0047583 A1 | 2/2011 | Howard et al. |
| 2011/0268274 A1 | 11/2011 | Qiu et al. |

FOREIGN PATENT DOCUMENTS

| | | |
|---|---|---|
| EP | 1710656 A1 | 10/2006 |
| EP | 1804428 A2 | 7/2007 |
| EP | 1881664 A1 | 1/2008 |
| JP | 2001054171 | 2/2001 |
| JP | 200835517 A | 2/2008 |
| KR | 100703018 B1 | 10/2006 |
| KR | 1020060113926 A | 11/2006 |
| KR | 100778477 B1 | 11/2007 |
| WO | 98/18234 A1 | 4/1998 |
| WO | 2007094347 A1 | 8/2007 |
| WO | 2008002081 A1 | 1/2008 |

OTHER PUBLICATIONS

Wireless Home Digital Interface, http://www.whdi.org/Technology/, downloaded Mar. 25, 2010.

United States Patent and Trademark Office, "Non-Final Rejection" for U.S. Appl. No. 12/344,994 dated May 23, 2013, 10 pages.

European Patent Office, "Extended European Search Report" for European Application No. 09836624.8 dated Jul. 19, 2013, 6 pages.

European Patent Office, "Extended European Search Report" for European Application No. 09836653.7 dated Jul. 26, 2013, 7 pages.

Barker, E, and Kelsey, J., "Recommendation for Random Number Generation Using Deterministic Random Bit Generators (Revised)," NISY Special Publication 800-90, p. 133 (2007).

Menezes, et al., "Handbook of Applied Cryptography," Chapter 12, CRC Press Inc., pp. 489-541 (1997).

Soriente, et al, "BEDA: Button-Enabled Device Association," First International Worshop on Security for Spontaneous Interaction, Sep. 2007.

Final Office Action mailed Jan. 25, 2012, in U.S. Appl. No. 12/344,994, Jiang Zhang et al., filed on Dec. 29, 2008.

Non Final Office Action mailed Jan. 4, 2013, in U.S. Appl. No. 12/345,010, Paul Moroney et al., filed on Dec. 29, 2008.

Non Final Office Action mailed Mar. 2, 2012, in U.S. Appl. No. 12/344,997, Jiang Zhang et al., filed on Dec. 29, 2008.

Non Final Office Action mailed Sep. 1, 2011, in U.S. Appl. No. 12/344,994, Jiang Zhang et al., filed on Dec. 29, 2008.

Notice of Allowance mailed Aug. 11, 2011 in U.S. Appl. No. 12/345,002, Jiang Zhang et al., filed on Dec. 29, 2008.

Notice of Allowance mailed Jan. 10, 2013 in U.S. Appl. No. 12/344,997, Jiang Zhang et al., filed on Dec. 29, 2008.

Notice of Allowance mailed Jan. 18, 2012 in U.S. Appl. No. 12/345,002, Jiang Zhang et al., filed on Dec. 29, 2008.

Notice of Allowance mailed Sep. 30, 2011 in U.S. Appl. No. 12/345,002, Jiang Zhang et al., filed on Dec. 29, 2008.

Restriction Requirement mailed Jul. 18, 2012, in U.S. Appl. No. 12/345,010, Paul Moroney et al., filed on Dec. 29, 2008.

International Search Report and Written Opinion for International Application No. PCT/US2009/065670, European Patent Office, The Hague, Netherlands, mailed on Jun. 29, 2010.

International Search Report and Written Opinion for International Application No. PCT/US2009/066174, European Patent Office, the Hague, Netherlands, mailed on Jun. 23, 2010.

International Search Report and Written Opinion for International Application No. PCT/US2009/066178, European Patent Office, the Hague, Netherlands, mailed on Jun. 22, 2010.

International Search Report and Written Opinion for International Application No. PCT/US2009/066529, European Patent Office, the Hague, Netherlands, mailed on Jun. 28, 2010.

The State Intellectual Property Office of the People'S Republic of China, "Notification of the Second Office Action" for Chinese Patent Application No. 200980153092.4 dated Feb. 11, 2014, 12 pages translated.

European Patent Office, "Extended European Search Report" for European Application No. 09836638.8 dated Jul. 22, 2013, 8 pages.

European Patent Office, "Extended European Search Report" for European Application No. 09836637.0 dated Nov. 21, 2013, 5 pages.

\* cited by examiner

COMMUNICATING A DEVICE DESCRIPTOR BETWEEN TWO DEVICES WHEN REGISTERING ONTO A NETWORK

RELATED APPLICATIONS

This application claims the benefit of U.S. Provisional Patent Application Ser. Nos. 61/187,916, filed Jun. 17, 2009, and 61/223,271, filed Jul. 6, 2009, which are incorporated herein by reference in their entireties. The present invention also is related to U.S. patent application Ser. No. 12/345,010, entitled "Personal Identification Number (PIN) Generation Between Two Devices in a Network", by Paul Moroney and Jiang Zhang; U.S. patent application Ser. No. 12/344,994, entitled "Method of Targeted Discovery of Devices in a Network", by Jiang Zhang and Petr Peterka; U.S. patent application Ser. No. 12/344,997, entitled "Secure and Efficient Domain Key Distribution for Device Registration", by Jiang Zhang and Sasha Medvinsky; and U.S. patent application Ser. No. 12/345,002), entitled "Multi-Mode Device Registration", by Jiang Zhang and Petr Peterka, all of which are incorporated herein by reference in their entireties.

BACKGROUND

The Wireless Home Digital Interface (WHDI) is a wireless standard proposed for a wireless multimedia device network, which may be used at home, in the office or in other short-range wireless network environments. WHDI allows for high bandwidth wireless channels for sending content between devices, which may support uncompressed High Definition (HD) content. For example, a DVD player may be wirelessly connected to multiple HDTVs and send uncompressed content to the HDTVs using WHDI. WHDI eliminates the need for cabling, such as High Definition Multimedia Interface (HDMI) cables, component cables, etc., used to transmit uncompressed content between devices. Conventional wireless technologies such as 802.11, BLUETOOTH, etc., do not have the bandwidth or interface to transmit uncompressed multimedia content between devices.

WHDI can be used in various environments. For example, a user located in a single family home or in an apartment may connect a DVD player, an MP3 player, a laptop PC, a gaming console, and a flat panel TV all together, wirelessly, using WHDI. In another environment, a user wirelessly connects a multimedia projector in a conference room to a desktop PC in his office, and to a set of notebook computers using WHDI. In these and other examples, security is a concern because of the wireless communication between the WHDI devices. Due to the nature of wireless networks, they are typically easy to identify by unauthorized users. An unauthorized user may attempt to identify and connect to the devices connected to a home WHDI network. The homeowner may desire to keep the identity of their devices private away from unauthorized users. For example, a homeowner may not want a neighbor to know they have 5 HDTVs, or they may not want any non-family members to know they have a server connected to their home network, because the server may contain confidential information, such as personal videos, etc. While WHDI provides the protocol and interfaces for high-bandwidth wireless networks, WHDI may lack the security procedures to maintain user privacy.

SUMMARY

In accordance with the present invention, a method and apparatus is provided for registering a first device with a second device over a wireless network. The method includes receiving a registration request from the first device and sending one or more user input choices to the first device. The user input choices each specify a user input action available though a user interface associated with the second device. A device description describing the second device is sent to the first device in a manner that allows it to be presented to the user by the first device. At least one of the user input actions are sequentially received through the user interface in response to instructions provided to the user by the first device. The first device is registered with the second device if the user input actions received by the second device correctly reflect the instructions provided to the user by the first device.

In accordance with another aspect of the invention, a method is provided for registering a first device with a second device over a wireless network in which a registration request is sent to the second device. One or more user input choices are received from the second device. The user input choices each specify a user input action available though a user interface associated with the second device. A device description describing the second device is received and presented to a user. based on the received user input choices, instructions are presented to the user specifying a sequence of user input choices representing a sequence of user input actions to be performed on the second device. The first device is registered with the second device if the user input actions received by the second device correctly reflect the instructions presented to the user.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

WHDI is a proposed standard for high bandwidth wireless digital data connectivity between multiple points. WHDI wirelessly transmits multimedia data, such as high definition video and the associated audio in a reliable manner from source devices to sink devices in the WHDI network. Devices in a WHDI network are referred to as WHDI devices, and a WHDI network include WHDI devices communicating wirelessly amongst each other using the WHDI standard. WHDI devices are characterized as two types. One type is a source device and the other type is a sink device. A WHDI device may be a source device, a sink device, or both depending on its functionality. A source device transmits data streams across a WHDI network to a sink device, and a sink device receives data streams across the WHDI network from the source device. Examples of source devices are set-top boxes, notebook Personal Computers (PCs), desktop PCs, DVD players MP3 players, video camcorders, audio/video receivers, gaming consoles, etc. Examples of sink device are TVs, PCs, projectors, etc.

Many device networking technologies including WHDI face the issue of how to securely allow a new device to become part of an existing network. One way of doing this is to use a Personal Identification Number (PIN) during a device registration process. The device registration is a process to let a new device join another device or a network of devices in a domain. A domain is a group of devices that are approved to share content with each other. Device registration or domain registration includes the process of allowing or preventing a device from connecting with other devices over a network. Device registration can provide a user with control over which devices are allowed to connect to the other devices in the user's domain. For instance, if a family has a domain, then all the devices owned by the family may be members of the domain, but a friend's device may not be allowed to join the domain.

In order to provide the user with control over which devices are allowed to connect to a domain or another device, WHDI devices generally support three registration configuration settings: domain registration, device registration and no more registration. When the domain registration setting is employed on an existing device, a remote device is allowed to register with this device as well as all other devices in the domain of this device. In this configuration the existing device provides the remote device with a domain key as well as its device registration key. When the device registration setting is employed on an existing device, a remote device is allowed to register with this existing device only. (However, the existing device may be able to register with the remote device's domain if the remote device is configured in the domain registration mode). In this configuration the existing device provides the remote device with its device registration key but not its domain key. Finally, when the no more registration setting is employed on an existing device, the existing device will not allow any registration operation. Any remote devices already registered remain registered when the no more registration setting is activated.

Prior to a new device being allowed to connect to an existing device or join a domain, the new device must be authorized or pre-approved to ensure that it is a device that the user wants to connect to the existing device or domain. For example, a family member may purchase a new TV that the family member wants to become part of the family domain so that the TV can play content received from other devices in the family domain, such as a set-top box or a DVD player. If a neighbor purchases a TV, the family member likely does not want the neighbor's TV to join the family's domain. However, the neighbor's TV may inadvertently attempt to become part of the family domain through a wireless network. This problem is illustrated in connection with FIG. 1, which shows three wireless devices, a TV 102, a set top box (STB) 104 and a DVD 106. If the TV 102 is a new device that wishes to connect to the existing STB 104, it sends a message M1 to STB 104 and the user 108 expects the STB 104 to respond with message M2. However, the DVD player 106 can also receive the message M1 and respond with message M2'. As the connection is wireless, the user cannot easily determine which device has responded to its message M1. This could be a security problem because the user's neighbor could use his DVD player to respond and register with the user's TV. Once registered, the neighbor could send unwanted content to the user. Accordingly, it would be helpful if the user could identify the device with which a new device is communicating during the registration process.

Currently, in a WHDI network, the user can identify the device that responds to its message M1 using the WHDI certificate of the responding device. This certificate, which includes device manufacturer information and a unique device ID such as a serial number, is typically included in the message M2 that is sent to the user's device. The user can identify the device by comparing the device ID in the certificate to the device ID that is physically located on the device it expects to have sent the message M2. If the two IDs are the same, then the user has confirmed that the message has been received from the correct device. One problem with this approach is that it may not be particularly convenient for the user. For instance, the user may have difficulty finding the device ID that is printed or otherwise located on the device. One way to overcome this problem would be to include in the certificate a device descriptor that the user can quickly and easily determine from an examination of the device. Such a device descriptor may be a model name or number, the device color, a style name or number, and so on.

Unfortunately, it may not be convenient for the manufacturer to include such a device descriptor in the certificate itself Manufacturers typically buy certificates in bulk and often will not know at the time of purchase the precise device in which they will be installed. Rather, it will often be more practical for the manufacturer to install the device descriptor in the device itself during the manufacturing process. Thus, instead of including a device descriptor in the certificate, the device descriptor can be included directly in the messages that are exchanged between devices during the device registration process in which the new device is authorized to connect to the existing device. Upon receiving the device descriptor, the receiving device can present it to the user so that the user can determine if it is communicating with the correct device. If it is the correct device, the user can continue with the registration process, otherwise the user can terminate the process.

One example of a registration process will be presented below in the context of a WHDI network illustrating the use of a device descriptor of the type described above. In this example, which will be described in connection with the WHDI network shown in FIG. 2, a PIN is generated by the existing device and presented to the user. The user then enters the PIN into the new device to confirm that the device with which the existing device is communicating is in fact the correct device to which the user wants to connect. Prior to entering the PIN, the new device sends its device descriptor to the existing device, which in turn presents it to the user. If the user determines that the new device is the correct device, the user proceeds with the registration process by entering the PIN. If the new device is not the correct device, the user can terminate the registration process.

It should be noted that while in this example it is the new device that sends its device descriptor to the existing device, the techniques described herein are applicable to the opposite situation. That is, the existing device may send its device descriptor to the new device. In this case the new device may generate the PIN and the user will be required to manually enter the PIN into the existing device instead of the new device. In the context of a WHDI network, the sink device is generally the device that initiates the registration process and which receives the device descriptor from the source device.

Figure 2:
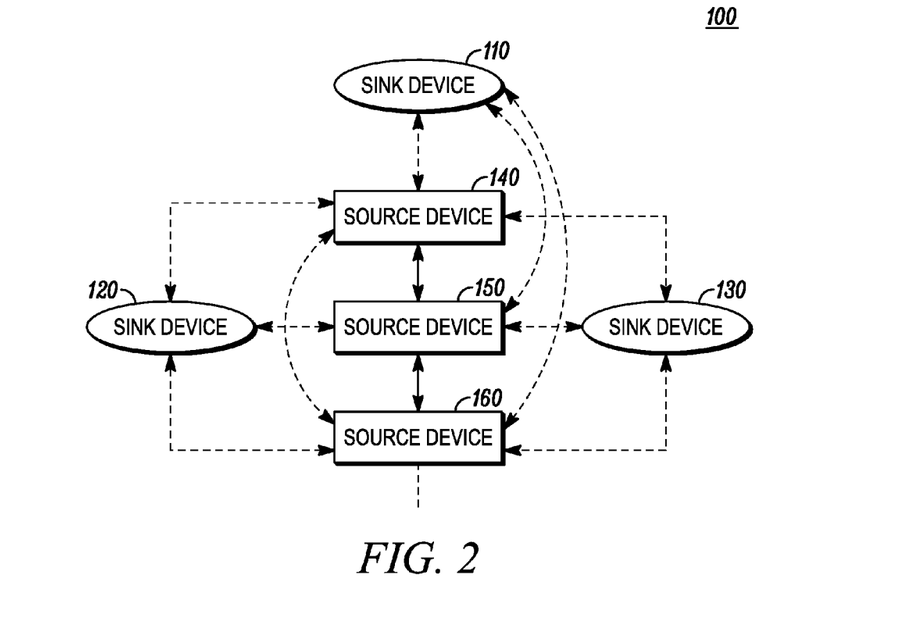
FIG. 2 illustrates a simplified block diagram of a Wireless Home Digital Interface network according to an embodiment of the present invention.

FIG. 2 illustrates a simplified block diagram of a WHDI network 100. FIG. 2 shows a set of sink devices including a sink device 110, a sink device 120, and a sink device 130, and a set of source devices including a source device 140, a source device 150, and a source device 160. In one embodiment, the sink device 110 is a flat panel HDTV in a living room, the sink device 120 is a TV in a kitchen, such as a TV installed on a refrigerator, and the sink device 130 is a TV for a treadmill. Further, the source device 140 is a notebook PC, the source device 150 is DVD player, and the source device 160 is a gaming console. It will be apparent that the WHDI network 100 may include additional sink devices and/or additional source devices not shown and that some of the sink devices and the source device described may be removed or new WHDI devices added.

The source devices 140, 150, and 160 may deliver any type of content, such as video content, audio content, or other data content from the Internet. Each of the source devices 140, 150, and 160 may deliver independent and possibly different content. In addition, each of the source devices 140, 150, and 160 may have a different connectivity with each of the sink devices 110, 120, and 130. Any one of the source devices 140, 150, and 160 may be connected to one or more of the sink devices 110, 120, and 130 simultaneously (e.g., for multicasting) or separately (e.g., unicasting).

When the source device 140 attempts to wirelessly connect to the sink device 110 within the WHDI network 100 for the first time, the sink device 110 needs to determine whether the source device 140 is a WHDI compliant device and authorized to access the sink device. Likewise, the source device 140 also needs to determine whether the sink device 110 is a WHDI compliant device and authorized to access the source device. A device is a WHDI compliant device if it is certified by a WHDI organization as a WHDI standard compliant device, in which case it is issued a WHDI device certificate. Whether a device is a WHDI standard compliant device can be verified by the existence of a valid WHDI PKI (Public Key Infrastructure) device certificate, which is issued by the WHDI certificate authority and stored in the device. Even with a valid certificate, however, a device must still be "authorized" in order to be able to access the other device. For example, if the source device 140 is a media player belonging to your neighbor who wants to stream data of an adult content or an unsolicited advertisement to your HDTV while you are watching a Children's programming channel with your kids, the source device 140 would not be authorized to connect to the sink device 110.

In FIG. 2, the sink device 110 can generate a PIN for the source device 140 based on the type of user inputs available on the source device 140. Such user inputs may include physical and virtual buttons or any other suitable option. The source device 140 can also take part in the PIN generation process by providing user input choices to the sink device 110 as well as a randomly selected value that is associated with each of the input choices. These values can then be encrypted by the source device 140 using the sink device 110's public key, which the sink device 110 can decrypt using its own private key. Once the sink device 110 generates the PIN the sink device 110 presents instructions to the user which specify how to manually enter it into the source device 140. For instance, the instructions may specify an order in which the user inputs should be entered into the source device 140 by the user. The source device 140 can then generate its own PIN based on the user input actions it received. After the PIN generated by the sink device 110 is confirmed to be the same as the PIN the user entered into the source device 140, the devices may register with each other so that the source device 140 may join the existing WHDI domain in which the sink device 110 belongs. In this example the existing domain that defines one or more WHDI devices which a particular WHDI device is authorized to send and/or receive content is the network 100.

The WHDI network 100 also provides the ability to stream the persistently-stored content from the initial source device to another sink device, or from the initial source device to another source device that has been authenticated as part of the WHDI network. Of course, it is noted that while a home network is described, extensions to a business, education, public entertainment or other such local wireless network are analogous. It will be apparent that the WHDI network 100 may include additional elements not shown and that some of the elements described herein may be removed, substituted and/or modified without departing from the scope of the WHDI network system 100. It should also be apparent that one or more of the elements described in the embodiment of FIG. 2 may be optional.

Figure 3:
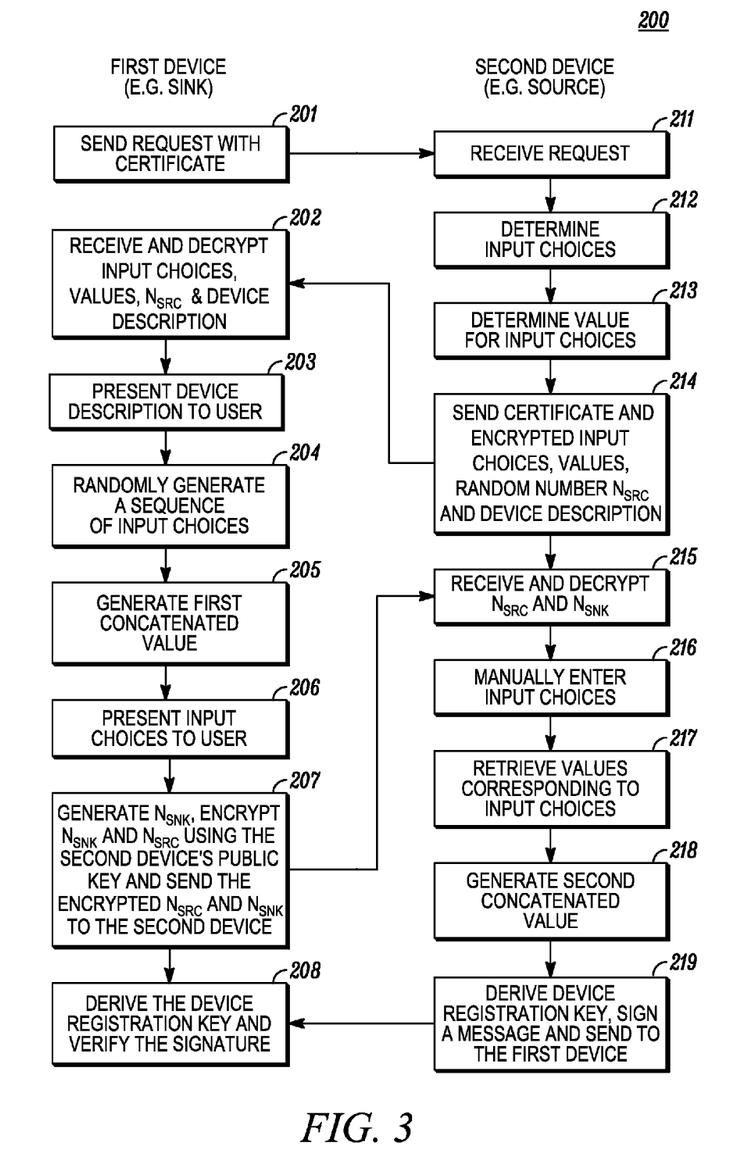
FIG. 3 illustrates a flow diagram of a method in which a sink device registers with source device in a WHDI network.

One example of a registration method 200 in which a device joins the WHDI network 100 will now be described with respect to the flow diagram depicted in FIG. 3. It should be apparent to those of ordinary skill in the art that the method 200 represents a generalized illustration and that other steps may be added or existing steps may be removed, modified or rearranged. Likewise, when information is stated to be sent in a message or other communication from one device to another, the information may be delivered in a single such message or multiple messages. That is, the information that is communicated between devices may be aggregated in a single message or divided into two or more messages. Also, the method 200 is described with respect to a WHDI network by way of example and not as a limitation, and thus method 200 may be used in other networks as well. In this example the first device is a sink device and the second device is a source device, such as the sink and source devices described with respect to FIG. 2 in a WHDI network. Further by way of illustration, the second device is a new device that a user wishes to register with the first device that is already a part of the WHDI network 100.

At step 201, the first device sends a registration request message to the second device. The message includes the first device's WHDI certificate and its device ID. At step 211, the second device receives the request.

After receiving the registration request and the WHDI PKI certificate, the second device selects or otherwise determines one or more input choices at step 212. The input choices may also be pre-defined during the device manufacturing process. An input choice defines an action that is used to manually enter information into the second device. For instance, an input choice may identify a button or other input on the second device that the user may subsequently use to manually enter the PIN that is constructed by the second device. The input choices will generally depend on the particular type of device that is involved. For instance, if the second device is a DVD player, examples of input choices may be function keys such as "PLAY", "STOP" and "PAUSE." In another example, a notebook PC may use the keys on its keyboard as input choices. Likewise, another example of an input choice may be a predetermined number of clicks of a button. For instance, 3 clicks on a PLAY button may be one input choice and 2 clicks on a PAUSE may be another input choice.

Next, at step 213, the second device selects or otherwise determines values that are to be associated with each input choice. Each value may be a number that may be randomly selected. In one example in which buttons are employed, the input choices and their corresponding values define a button list. The button list includes the button names and their respective values. One example of a button list is {(PLAY, 10), (PAUSE, 13), (STOP, 24)}.

At step 214, the second device transmits the input choices and their corresponding values to the first device with a random number Nsrc, which will be used to derive the device registration key shared between the two devices, and the second device's WHDI device certificate. Although not shown in FIG. 3, the transmission may be secured, for example, by encrypting the secret information being transmitted. For example, if the first device has sent its WHDI device certificate to the second device, the second device may use the first device's public key, which is available in the certificate, to encrypt the random number Nsrc, the input choices and their corresponding values. In addition, the transmission sent in step 214 may also include a device descriptor that is stored in the second device. The device descriptor is a user-friendly identifier from which the user can quickly and easily confirm that it correctly describes the second device. It can be set by the device manufacturer. Thus, the device descriptor may be a model name or number, a style name or number, and/or other attributes of the second device such as its color, screen size in the case of a TV, etc. In this example the device descriptor is included in the same message that contains the input choices and their corresponding values. It should be noted however, that the device descriptor may be sent to the first device by the second device in a separate message that is transmitted either before or after the input choices and the values associated therewith. Regardless of the message in which it is sent, the device descriptor may be encrypted, using, for example, the first device's public key to prevent it from being modified. It should also be noted that since the message that can be encrypted by the device's public key has a limited length, a secret symmetric key may be derived from data being encrypted by the public key. Since the public key encrypted data includes the random values for the input choices, the derived symmetric key could look like it is randomly chosen for each transaction if the random values of the input choices are included along with the random number Nsrc in the key derivation, and only the first device, which has the private key, can decrypt the encrypted data and consequently derive the correct symmetric key. In addition, if possible, a randomly generated symmetric key or a symmetric key seed can be added into the data being encrypted using the device's public key. The symmetric key seed can be used to derive a symmetric key to encrypt and/or authenticate the device descriptor using a symmetric cryptographic algorithm. The symmetric encryption algorithm can be, for example, an AES (Advanced Encryption Standard) algorithm. Of course, other asymmetric and symmetric algorithms may be used as well. The symmetric authentication algorithm can be, for example, AES-CMAC or SHA1 HMAC algorithm, or some other algorithms. Another method to authenticate the device descriptor is to use a message digest (i.e. hash) or message authentication code (MAC) of the device descriptor and encrypt it together with the device descriptor. After sending the device descriptor, the second device may be placed in a user entry mode during which its user interface can be used to manually input a PIN. In this way the user interface interprets user input actions as numbers that define the PIN.

At step 202, the first device receives the random number Nsrc, the input choices and corresponding values from the second device. If included in the same message, the device descriptor is also received. If the information is encrypted, the first device decrypts it using, for example, its private key. If the device descriptor is encrypted and/or authenticated using the symmetric key, the first device decrypts the secret data encrypted by the device's public key first and then derives the symmetric key from the decrypted secret data and further decrypts and/or authenticates the device descriptor using the symmetric key. If the device descriptor is authenticated using the encrypted hash or MAC, the hash or MAC of the device descriptor will be verified after being decrypted using the symmetric key. If the device descriptor is also received at this point, the first device presents it to the user in step 203. For example, the device descriptor may be displayed on a screen or presented in another other appropriate manner, which in part will depend on the capabilities of the first device. If the user confirms that the device descriptor matches the correct second device, the user may continue with the registration process. If, on the other hand, the user finds that the first device is communicating with the wrong device, the user may stop the registration process and restart a new registration process with the correct device. It should be noted that the device descriptor may be received and presented to the user by the first device at any point during the registration process before the user is instructed to manually enter the input choices into the second device in step 215, which will be described below. For example, the device descriptor can also be included with the device discovery message, which the first device broadcasts to find all the reachable WHDI devices.

At step 204, the first device randomly generates a sequence of the input choices from the received list of input choices. Alternatively, the sequence may be selected in any other manner. For example, if the input choices and their corresponding values are the button list {(PLAY, 10), (PAUSE, 13), (STOP, 24)}, the first device may select a random sequence of the buttons, such as {(STOP, 24), (PLAY, 10), (PAUSE, 13)}. The number of input choices that are used in the sequence can also be randomly determined by the first device. That is, not all the input choices need to be used in the sequence that is selected. Similarly, an input choice can be repeated multiple times in the sequence.

At step 205, the first device generates a first concatenated value from the values in the selected sequence. There are various ways to concatenate such values. For example, if the sequence of input choices is STOP, PLAY, PAUSE and the corresponding values are 24, 10, and 13, respectively, the first concatenated value may be 241013. Alternatively, the values can be concatenated in binary form or the values can be concatenated after undergoing a transformation (e.g. adding a number, e.g., 5, to each value).

At step 206, the first device presents instructions to the user specifying a sequence of user input actions to perform on the second device. In particular, the instructions specify the selected sequence in which the input choices should be entered into the second device. The values corresponding to those input choices are generally not presented. Depending on the nature of the first device, the sequence may be presented in an audible and/or visual manner. For example, if the first device is a TV, the TV may display the sequence STOP, PLAY, PAUSE.

At step 207, the first device generates another random number Nsnk, which will be used to derive the device registration key, encrypts the random numbers Nsnk and Nsrc using the second device's public key available from the received certificate and sends the encrypted random numbers Nsnk and Nsrc to the second device.

At step 215, the second device receives the encrypted Nsrc and Nsnk and decrypts them using its private key.

At step 216, the user manually enters the input choices into the second device in the selected sequence. For example, if the sequence is STOP, PLAY, PAUSE, the user pushes the STOP, PLAY, PAUSE buttons, in that order, on the second device.

At step 217, the second device retrieves or otherwise obtains the value corresponding to each input choice. For example, in the case of a button list, the button list is stored in the second device and is retrieved to determine the corresponding value for each input choice.

At step 218, the second device generates a second concatenated value from the individual values in the sequence of input choices entered by the user. For example, if the sequence of input choices is STOP, PLAY, PAUSE, the corresponding values are 24, 10, and 13, respectively. The second concatenated value may be 241013. Alternatively, the values may be concatenated in any other suitable manner, provided that the first and second concatenated values are determined in the same way by the first and second devices, respectively.

At step 219, the second device uses the Nsrc, Nsnk and the second concatenated value (as a PIN) to derive the device registration key, and uses the derived key to sign a message and send back to the first device.

At step 208, the first device uses the first concatenated value (as a PIN) to derive the device registration key with the Nsrc and Nsnk. Then the first device uses the device registration key to verify the signature received from the second device. If the signature is verified, it proves that the second device can decrypt the random number Nsnk using its private key, which implies that the second device is an authentic WHDI device, and also generated the same PIN (implying that the user input actions received by the second device correctly reflect the instructions provided to the user by the first device). The newly added device (the first device in this example) is then allowed to register with the other device (the second device in this example). If the domain registration mode is selected, the second device may also use the device registration key to encrypt the domain key that is sent to the first device in step 218, which decrypts the domain key using the device registration key. Thus, the newly added device also becomes a member of the domain to which the other device belongs. In this way, the two PINs are compared indirectly.

As described above, a button list includes one or more input choices and their corresponding values. In another embodiment, the button list does not include the values, but only the input choices, which may be a set of buttons available on the second device. The first device can select a sequence of these input choices and present them to the user. The first device can also derive a PIN from the input choices. The user can then enter the input choices into the second device in the correct sequence. The second device can use the same procedure as the first device to generate a PIN from the input choices it receives from the user. The PINs derived in this manner can be compared indirectly in the manner described above in order to establish a connection.

Note that the method 200 provides security because a user of an unauthorized first device would not be able to access the second device and enter the input choices to generate the same PIN on the second device using the method 200. On the other hand, if the second device is an unauthorized device, the owner of the second device may not be able to see the input instructions given by the first device and consequently will not be able to type in the correct PIN to complete the registration.

Some or all of the operations set forth in the method 200 may be contained one or more computer programs stored in any desired computer readable storage medium and executed by a processor on a computer system. Exemplary computer readable media that may be used to store software operable to implement the present invention include but are not limited to conventional computer system Random Access Memory (RAM), Read Only Memory (ROM), Electrically Programmable Read Only Memory (EPROM), Electrically Erasable Programmable Read Only Memory (EEPROM), hard disks, or other data storage devices.

Figure 1:
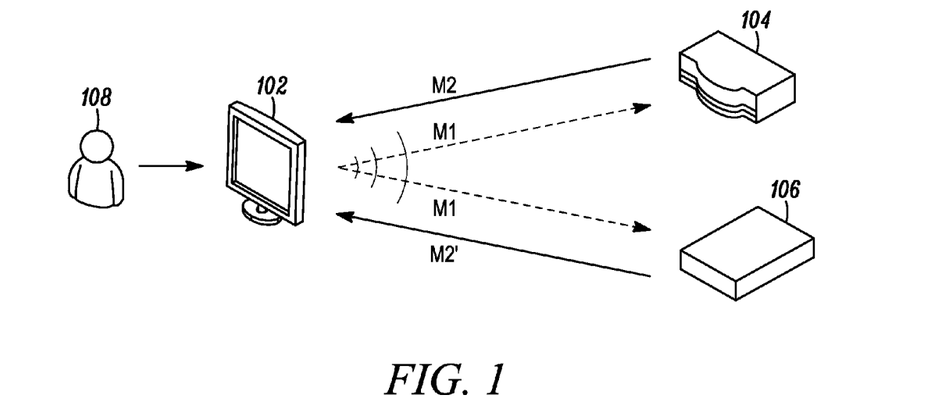
FIG. 1 shows a TV that is attempting to wirelessly register with a set top box by sending a registration request to the set top box.

In one embodiment, the components of the WHDI network 100 in FIG. 1 can be grouped into subsystems. These WHDI subsystems interact with other devices throughout the system, including source devices and their accompanying sink devices, to share the content resident within or sent to the WHDI network 100.

Figure 4:
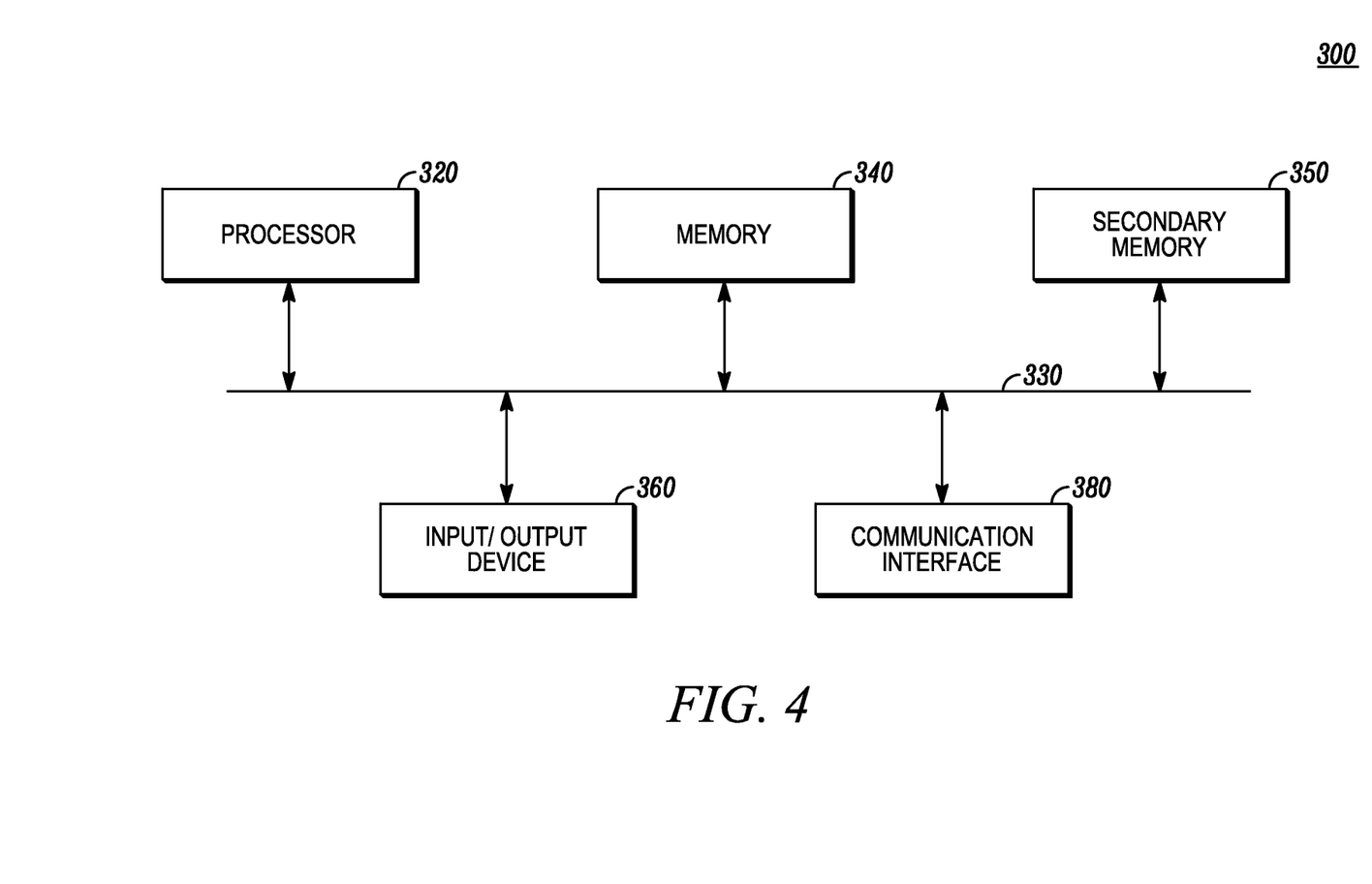
FIG. 4 shows a block diagram of a computer system that may be used as a platform for the devices shown in FIG. 1, according to an embodiment of the present invention.

FIG. 4 shows the block diagram of a computer system 300 that may be used as a platform for a first device, second device, source device, or a sink device. The computer system 300 may also be used to execute one or more computer programs performing the method, steps and functions described herein.

The computer system 300 includes a processor 320, providing an execution platform for executing software. Commands and data from the processor 320 are communicated over a communication bus 330. The computer system 300 also includes a main memory 340, such as a Random Access Memory (RAM), where software may reside during runtime, and a secondary memory 350. The secondary memory 350 may include, for example, a nonvolatile memory where a copy of software is stored. In one example, the secondary memory 350 also includes ROM (read only memory), EPROM (erasable, programmable ROM), EEPROM (electrically erasable, programmable ROM), and other data storage devices, include hard disks.

The computer system 300 includes I/O devices 360. The I/O devices 360 may include a display and/or user interfaces comprising one or more I/O devices, such as a keyboard, a mouse, a stylus, speaker, and the like. A communication interface 380 is provided for communicating with other components. The communication interface 380 may be a wired or a wireless interface. The communication interface 380 may be a network interface.

The processor 320 may be configured to select a sequence of user input choices from the user input choices that are received from a remote device and generate a PIN from the selected sequence. The processor 320 may also be configured to present to the user, via at least one of the I/O devices 360, the device description received from the remote device and the selected sequence of user input choices. Alternatively, or in addition thereto, the processor 320 may be configured to generate the user input choices and send them, along with its device descriptor, to a remote device.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A method for registering a first device with a second device over a wireless network, comprising:
   receiving a registration request from the first device including a first personal identification number (PIN);
   sending one or more user input choices to the first device, said user input choices each specifying a user input action available through a user interface associated with the second device,
   associating a number with each of the user input choices;
   sending the numbers to the first device;
   sending a device description describing the second device to the first device in a manner that allows it to be presented to a user by the first device;
   sequentially receiving at least one of the user input actions through the user interface in response to instructions provided to the user by the first device;
   generating a second PIN based at least in part on the numbers, wherein the user input actions received by the second device correctly reflect the instructions provided to the user by the first device if the second PIN matches the first PIN; and
   registering the first device with the second device if the user input actions received by the second device correctly reflect the instructions provided to the user by the first device,
   wherein the wireless network comprises a wireless home digital interface (WHDI) network.

2. The method of claim 1 further comprising:
   receiving a device certificate from the first device, said device certificate including a public key associated with the first device; and
   encrypting the user input choices sent to the first device using the public key.

3. The method of claim 2 further comprising encrypting the device description sent to the first device using the public key.

4. The method of claim 1 further comprising encrypting the device description sent to the first device using a symmetric key derived from data encrypted by a public key associated with the first device.

5. The method of claim 1 further comprising authenticating the device description using a symmetric key with a symmetric key algorithm.

6. The method of claim 1 further comprising authenticating the device description using an encrypted hash or a message authentication code of the device description.

7. The method of claim 1 further comprising aborting registration of the first device with the second device if the user does not provide an input action through the user interface based on the device description presented to the user.

8. A method for registering a first device with a second device over a wireless network, comprising:
   sending a registration request to the second device including a first personal identification number (PIN);
   receiving one or more user input choices from the second device, said user input choices each specifying a user input action available through a user interface associated with the second device;
   wherein a number is associated with each of the user input choices by the second device and the second device only allows communication with the first device when the PIN number is accepted by the second device;
   receiving a device description describing the second device;
   presenting the device description to a user;
   based on the received user input choices, presenting instructions to the user specifying a sequence of user input choices representing a sequence of user input actions to be performed on the second device; and
   registering the first device with the second device if the user input actions received by the second device correctly reflect the instructions presented to the user,
   wherein the wireless network comprises a wireless home digital interface (WHDI) network.

9. The method of claim 8 wherein the device description is encrypted with a symmetric key derived from data encrypted by a public key associated with the first device and further comprising decrypting the data with a private key associated with the first device, deriving the symmetric key from the data, and decrypting the device description with the symmetric key.

10. The method of claim 8 further comprising authenticating the device description using a symmetric key with a symmetric key algorithm.

11. The method of claim 8 further comprising authenticating the device description using an encrypted hash or a message authentication code of the device description.

12. The method of claim 8 further comprising sending a device certificate to the second device, the device certificate including a public key associated with the first device and wherein presenting the device descriptor to the user includes decrypting the device descriptor using a private key associated with the first device.

13. The method of claim 1, wherein the first device comprises HDTV and the second device comprises a device for distributing video signals including at least one of: a DVD player, a digital video recorder (DVR), a set top box, and a personal computer.

14. The method of claim 13, wherein the WHDI network comprises additional HDTVs.

15. The method of claim 8, wherein the first device comprises HDTV and the second device comprises a device for distributing video signals including at least one of: a DVD player, a digital video recorder (DVR), a set top box, and a personal computer.

16. The method of claim 15, wherein the WHDI network comprises additional HDTVs.

* * * * *